Dec. 4, 1934.  G. B. DURELL  1,983,074

METHOD OF MAKING GOLF CLUB SHAFTS

Filed June 11, 1931  3 Sheets-Sheet 1

INVENTOR.
George B. Durell.
BY
Slough and Canfield
ATTORNEY.

Dec. 4, 1934.   G. B. DURELL   1,983,074
METHOD OF MAKING GOLF CLUB SHAFTS
Filed June 11, 1931   3 Sheets-Sheet 2

INVENTOR.
George B Durell.
BY Slough and Canfield
ATTORNEY.

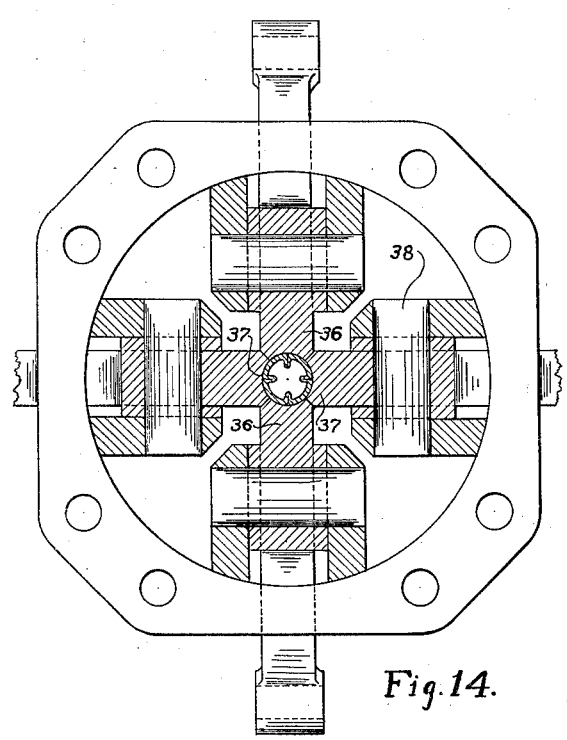
Fig. 14.
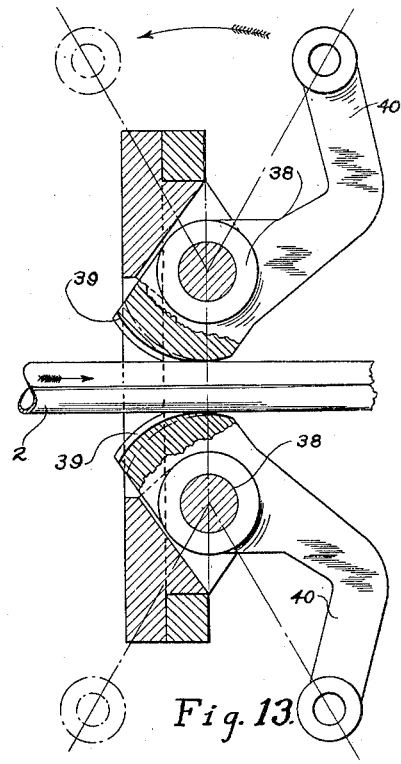
Fig. 13.
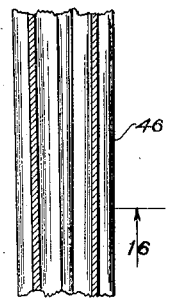
Fig. 16.
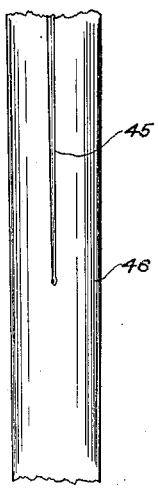
Fig. 18.
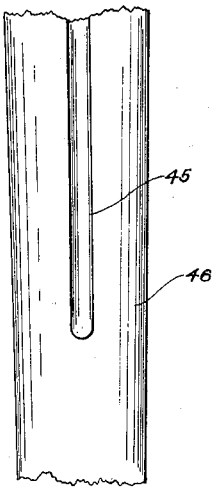
Fig. 17.
INVENTOR.
George B Durell.
BY
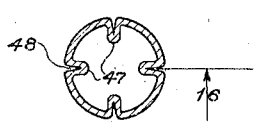
ATTORNEY.

Patented Dec. 4, 1934

1,983,074

UNITED STATES PATENT OFFICE 1,983,074

METHOD OF MAKING GOLF CLUB SHAFTS

George B. Durell, Cleveland, Ohio, assignor to The American Fork & Hoe Company, Cleveland, Ohio, a corporation of Ohio Application June 11, 1931, Serial No. 543,578

14 Claims. (Cl. 29—156)

My invention relates to golf club shafts and the process of making the same, and pertains more particularly to tubular golf shafts made of steel or other like resilient material.

The first golf club shafts of good quality to be made were made of good seasoned hickory material and although many attempts have been made to substitute steel tubes variously formed for the former hickory shafts, many players still prefer the hickory shafts for the reason that such shafts may be so fashioned that the inherent resiliency of the material, particularly as related to the torsional characteristics of the shaft, effects such a resilient yielding by the shaft when a golf ball is struck by the club head affixed to the small end of the shaft as to produce an accurate striking of the ball and at the same time being unaccompanied by an undesirable unpleasant vibration transmitted to the handle end of the shaft.

It has been before proposed to introduce some of the qualities of a good hickory shaft into a steel tubular shaft by providing the steel tubular shaft with ribs, grooves, or the like, but in all such cases, so far as I am aware, such efforts have resulted in only partial success for the reason that the desired torsional characteristics were not introduced into the different longitudinally disposed portions of the shaft in the proper relative degrees; or that in some cases the torsional effects produced were abnormal in at least certain portions of the shafts, making a "loggy" shaft; or for various other and sundry reasons depending upon the particular design of shaft employed.

An object of my invention, therefore, is to provide an improved tubular golf club shaft.

Another object of my invention is to provide a metallic tubular golf club shaft having properly graduated torsional characteristics in the different longitudinally disposed portions of the shaft.

Another object of my invention is to provide an improved golf club shaft of steel or like tubular material having the torsional and vibration subduing characteristics of a good hickory shaft.

Another object of my invention is to provide an improved method of making a metal tubular golf club shaft of superior quality.

Other objects of my invention and the invention itself will be clearly disclosed by the accompanying description of an embodiment of my invention and the means and method of making the same and from the accompanying drawings illustrating the said embodiment, means and method.

Figure 1:
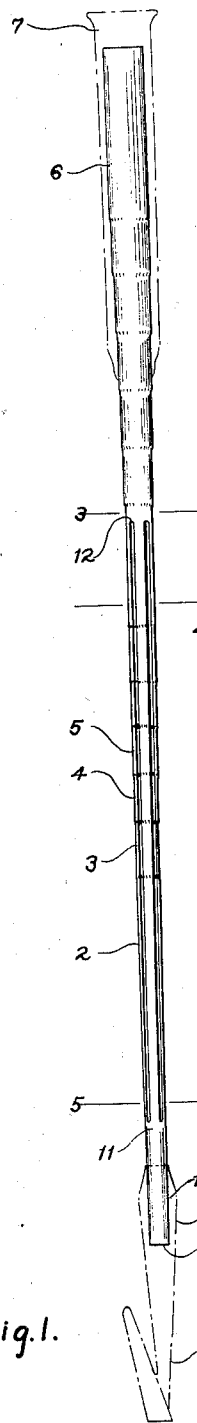
Fig. 1 illustrates in elevation a golf club shaft embodying the principles of my invention, the view being according to a reduced scale wherein the longitudinal dimensions are more reduced than the transverse dimensions.
Figure 2:
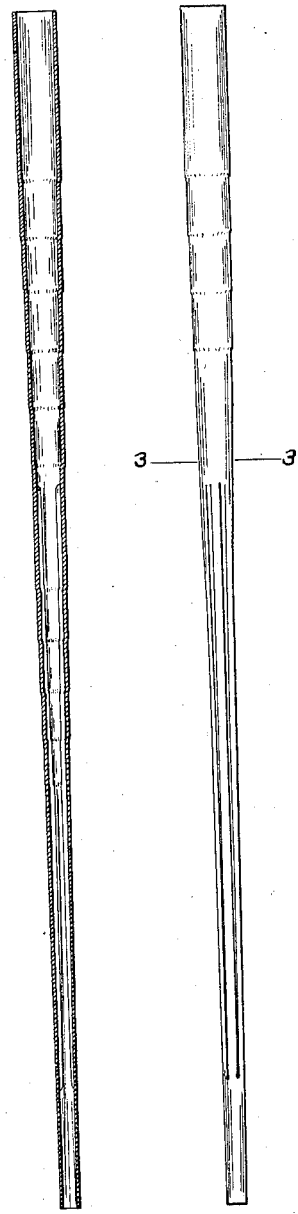
Fig. 2 is a view in longitudinal medial section of the shaft of Fig. 1, the view being according to the same scale as in Fig. 1.
Figure 15:
Figure 3:
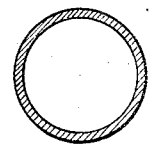
Figure 4:
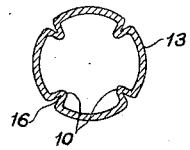
Figure 5:
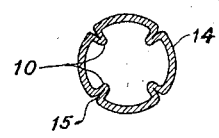
Figure 7:
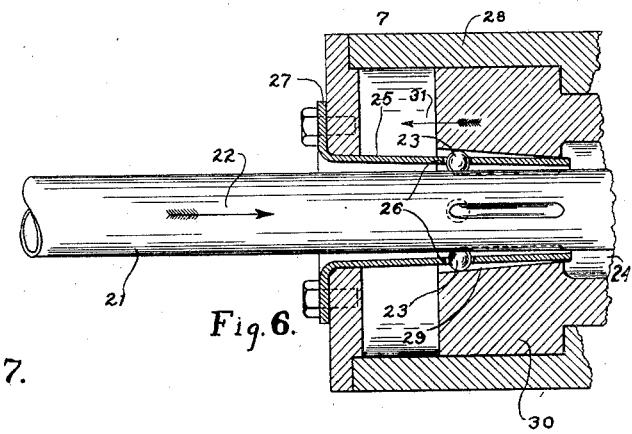
Figure 6:
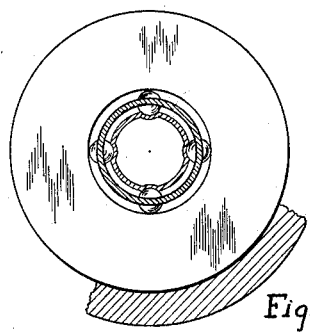

Figs. 3, 4, and 5 are sections taken on the lines 3—3, 4—4, and 5—5 respectively of Fig. 1;

Fig. 6 is a longitudinal sectional view of a compression grooving die and a section of a cylindrical tube operated upon thereby to illustrate a first operation in the forming of the shaft of my invention;

Fig. 7 a transverse section of the compression grooving die taken on the line 7—7 of Fig. 6;

Figs. 8, and 8A, 9 and 9A, 10 and 10A, 11 and 11A, and 12 and 12A are successive pairs of views, each pair in longitudinal medial section and transverse section respectively, illustrating successive stages of operation involved in the progressive reduction of successively shorter lengths of the shaft previously operated upon as illustrated in Figs. 6 and 7;

Fig. 13 is a longitudinal medial sectional view of a progressively adjustable compression die and a tube being operated upon thereby adapted to taper the small end of the shaft following the previously illustrated steps of process;

Fig. 14 is a transverse sectional view of the compression die shown in Fig. 13;

Fig. 15 is a longitudinal view of a tapering tube after it has been operated upon by the apparatus and process of my invention, the view being taken approximately from the plane 15 of Fig. 16;

Fig. 16 is a cross-sectional view taken from the plane 16 of Fig. 15;

Fig. 17 is a fragmentary view in elevation of a tapering tube after it has been operated upon by the apparatus of Fig. 6; and before being operated upon by the reducing dies of Figs. 8–12 and the apparatus of Figs. 13 and 14; and Fig. 18 is a view of the tube of Fig. 17 after it has been operated upon by the apparatus of Figs. 13 and 14.

Figure 19:
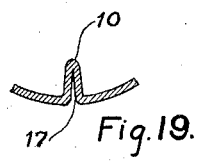

Fig. 19 is an enlarged showing of a portion of the section illustrated in Fig. 5.

Referring to Fig. 1 of the drawings, I have illustrated therein a tubular golf shaft made in accordance with my invention, and comprising a plurality of integrally formed substantially cylindrical tubular sections extending longitudinally of the shaft from a section 2 of least diameter, through intermediate sections of progressively increased diameter such as the sections 3, 4, 5 etc., until the larger end of the shaft is reached where it terminates in a cylindrical section 6 which may be suitably covered with a wrapping of leather or other hand-grip covering material according to the ordinary practice and indicated at 7. Preferably a larger number of the stepped sections such as 3, 4 etc. are provided, the usual number being about seventeen sections although this number may be varied.

The tubular section 2 in the embodiment of my invention under consideration is preferably made of greater length than the adjacent sections of progressively larger diameter, and is also provided with an external tapered surface, the section being of gradually decreased diameter proceeding from its junction with the tube section 3 to the end 9.

Internally the shaft is provided with internal ribs 10—10, preferably four in number, and equally spaced, although the number and the spacing may be varied, the ribs extending from a point on the tube section 2 longitudinally spaced from the end 9 of the tube as at 11, Fig. 1, and proceeding longitudinally of the shaft over a suitable extent of the stepped length of the shaft as, for example, to the point 12, Fig. 1, adjacent the upper end of the seventh section. The ribs essentially comprise in-folded portions of the lateral wall of the tube.

In the embodiment of my invention illustrated in Fig. 1, the internal ribs 10 extend inwardly from the lateral otherwise cylindrical wall 13 of the tube sections, 3, 4 etc., and from the slightly tapered wall 14 of the tube section 2 toward the axis of the tube and lie, preferably, parallel therewith. The inward radial extent of the ribs 10 is greater in the smallest section as, for example, the section 2, and progressively decreases proceeding from the section 2 upwardly of the shaft as viewed in the drawings. The difference in the inward radial extent of the ribs is plainly shown by comparison of Figs. 4 and 5.

In folding in the wall of the tube to compose the ribs 10, the material of the wall is so operated upon that the fold composing the ribs is outwardly open as shown at 15 and 16, Figs. 5 and 4, and as illustrated generally at 17 in Fig. 19 which has been drawn to a larger scale to more clearly illustrate this feature. Thus the external surface of the shaft is not a continuous cylindrical surface, but is longitudinally broken by fissures or circumferentially narrow grooves corresponding to each rib. Proceeding upwardly along the ribs, these external grooves or fissures in the wall of the shaft, generally indicated at 7, are progressively wider, being at their maximum width at the upper end 12 thereof, and as illustrated approximately in Fig. 4.

Between the lower end of the ribs as at 11 and the lower end of the tube as at 9, is a tapering portion of the section 2 indicated at 19 upon which the hosel 20 of a club head 21 is mounted.

I have found that a golf club having a handle shaft of the above described ribbed tubular structure, when used in play, reacts to the lateral strains and to the torsional strains set up therein very much in the same manner as the old prior hickory shaft.

I have found also that the lateral or transverse bending stresses put upon the shaft are absorbed by the ribs 10 in generally the same manner whether the folds composing the ribs are entirely closed together at the surface of the shaft or whether they are open, as shown generally at 17, Fig. 19, but I have also found that the torsional stresses applied to the shaft in play are absorbed in a manner more nearly, if not exactly, like that in the hickory shaft if, in forming the ribs, the grooves or fissures above described and shown generally at 17 are left of substantial circumferential width, that is, are outwardly open as indicated at 17. By leaving open grooves or fissures 17, in the outer surface of the tubular shaft, a torsional resilience is introduced into the shaft apparently due to the fact that under torsional strain, the grooves or fissures 17 may resiliently open and close to slight degrees. Each of the ribs is in cross-section of generally U-shape and can to a degree perform the functions of a U-shaped or hairpin spring, the sides of the U moving closer together or farther apart resiliently as torsion is put upon the shaft and released respectively.

By terminating the longitudinal fissures 17 and ribs 10 at a point spaced from the end 9 of the shaft as, for example at 11, an ungrooved unribbed portion 19 is left to which the club head may be secured, and I have found that the transmission of the stresses from the club head into the handle shaft is effected more efficiently if tarnsmitted first into a continuous cylindrical or tapered portion 19 of circular cross-section than into a grooved or ribbed portion, which would be the case if the ribs and grooves were extended to the end 9 of the shaft, particularly when it is desired to leave the fissures or grooves open as at 17. Furthermore, a more secure and durable connection between the hosel 20 of the club head and the end of the shaft may be effected upon a shaft section or shaft end having circular cross-section than upon a grooved one.

The extent upwardly along the shaft to which the ribs and outwardly open grooves or fissures 17 are carried may be varied. In the embodiment illustrated in Fig. 1, the ribs and grooves extend over seven of the stepped sections of the shaft.

The preferred process of making a shaft such as that illustrated in Fig. 1 is as follows. A cylindrical tube of the required diameter to provide the handle end section 6 is operated upon by a die apparatus such as illustrated in Figs. 6 and 7, and the tube indicated at 21 is drawn in the direction of the arrow 22 through a die pass consisting of a plurality such as four circumferentially spaced balls 23—23. During the longitudinal drawing movement of the tube 21, the balls 23 are forced inwardly radially and thus draw-press into the wall of the tube lonigtudinal parallel grooves 24. The balls 23 are constrained against movement longitudinally of the tube 21 and against shifting circumferentially around the tube or relative to each other by a tubular raceway 25 coaxial with the tube 21 and having perforations 26 therein encircling the balls 23. By means of a flange 27 the raceway 25 is secured rigidly to a die housing 28.

The balls 23 are surrounded by the conical bore 29 coaxial therewith and formed in a head 30 mounted in the die housing 28. The head 30 is connected to apparatus not shown by which it may be moved in the direction of the arrow 31 whereby the wall of the bore 29 may act upon the balls to force them inwardly radially of the tube 21 to the desired depth in the wall thereof to produce grooves of the desired depth.

The movement of the head 30 and of the tube 21 may be coordinated to effect a beginning and end of the grooves 24 and to regulate the depth thereof in any suitable manner. In the co-pending application of James L. Cassady, Serial No. 350,621, filed March 28, 1929, issued as Patent No. 1,957,388 on May 1, 1934, for Tube reforming machines, a drawing machine for drawing tubes through a ball type die pass is shown and described in which a head having a conical bore is moved longitudinally, concurrently with longitudinally drawing movement of the tube through the die pass. The die and the machine employing the same effecting longitudinal drawing of the tube through the die as described in that application may be employed to effect the operation above described in connection with Figs. 6 and 7. It is only necessary to supply the raceway 25 of Fig. 6 to prevent rotation of the balls 23 around the axis of the tube, and to control the movement of the head 30 so that it will effect a depression of the balls 23 into the wall of the tube to the desired depth, retain them at that depth until the other end of the groove is reached and then permit them to move outwardly radially.

Having provided the grooves 24 in the tube, the tube is then projected through a plurality of dies by successive operation to provide the successive stepped sections above referred to of successively smaller diameter. One type of apparatus by which this may be effected is described in the United States Letters Patent No. 1,670,530, dated May 22, 1928, for Golf shafts, issued to Robert H. Cowdery, wherein a handle shaft for golf clubs of stepped tubular form is disclosed together with the drawing or die apparatus for producing the same from a cylindrical tube.

In Figs. 8 and 8A to 12 and 12A inclusive, I have illustrated a number of successive dies by which the successively smaller diameter of the stepped tube may be formed, together with fragmentary portions of the tube itself, illustrating the successive reduction thereof and the production thereon of the shoulders intermediate each adjacent pair of sections, and the formation of the ribs within the tube.

Figure 8:
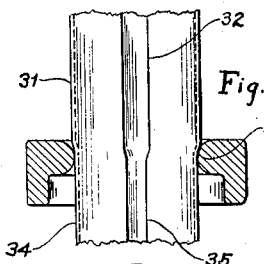
Figure 9:
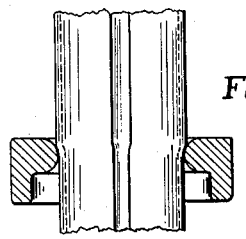
Figure 10:
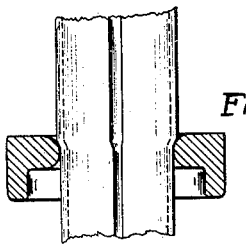
Figure 8A:
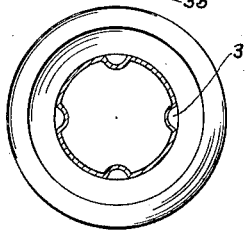
Figure 9A:
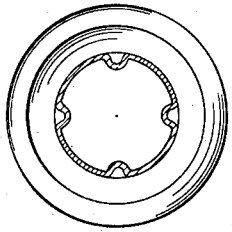
Figure 10A:
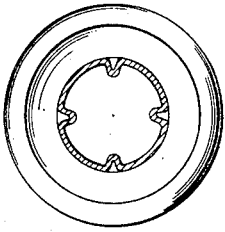
Figure 11:
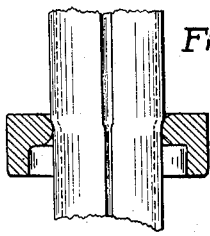

In Fig. 8, at 31, is indicated a portion of the tube section 2 before drawing the same and at 32 one of the grooves formed therein by the die of Fig. 6. At 33 is the drawing die through which the tube is drawn longitudinally reducing its diameter to that shown at 34 and partly closing up the grooves as at 35. In Fig. 8A, is shown the shape of the groove 35 at this time.

Figure 12:
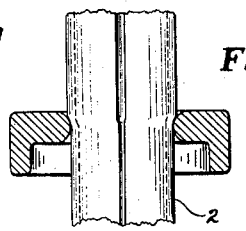
Figure 11A:
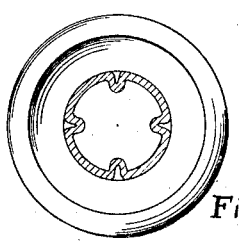
Figure 12A:
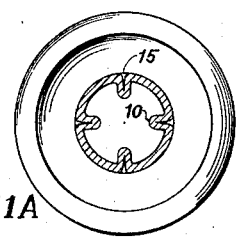

In the succeeding figures, 9 to 12A, the successive reduction of the tube to the final diameter at 2, Fig. 12, is illustrated together with the successive changes in the shape internally and externally of the ribs and grooves, respectively, ending finally in the cross-sectional configuration of Fig. 12A. As shown in this figure, inwardly the grooves have become the ribs 10 and outwardly the grooves have been almost entirely closed up leaving the longitudinal openings or crevices 15.

It is not intended that the Figures 8 to 12A illustrate successive sections of the golf shaft of Fig. 1, but that they illustrate successive phases of the tube and of the grooves therein during the successive drawing operations on the tube to produce the stepped sections.

The head 21 or the hosel 20 thereof, may be attached to the section 2 after it has finally been drawn through the last die and while it is in its cylindrical form, but I prefer to perform a taper drawing operation on the section 2 to taper it from substantially its conjunction with the section 3 to the end 9.

This operation may be performed in a drawing die and apparatus such as illustrated in Figs. 13 and 14. Apparatus of this character is illustrated more specifically and completely in the co-pending application of Batcheller, Serial No. 268,130, filed April 7, 1928, to which reference may be had for a more complete description of the contracting reducing die mechanism adaptable for use in the formation of tapered tubes or rods.

In a manner which will be well understood by reference to the Batcheller application, the formed end section 2 of the tube is placed between the reducing jaws which are arranged in oppositely disposed pairs 36—36 and 37—37, each of said jaws being journaled for rotation on a journal pin 38 individual thereto and provided with longitudinally extending grooved eccentric die faces 39, like portions of which of the different dies being adapted to be adjustably disposed for compressive engagement of the tube section 2 according to the rotational position of the die elements 36 and 37 as determined by the lever arm 40, one of which is provided for each die element, all of the lever arms being moved in unison at a given rate while the tube section 2 is drawn through the die aperture defined by the contiguous faces 39, the rate of movement of the lever arms 40 being commensurable to the rate of longitudinal movement of the tube 2 through the die aperture, whereby the die element faces will increasingly compress the tube 2, proceeding along its longitudinal direction.

The result is that the substantially cylindrical tube provided with internal ribs as before described is progressively reformed to a tapered shape as illustrated in Fig. 1, the exterior diameter of which is progressively reduced, proceeding toward the end 9 of the shaft section 2 of the finished tube from the stepped section 3.

The compressive reduction operation accomplished with the apparatus of Figs. 13 and 14 upon the tube section 2 to reform it to tapered form tends to increase the degree of closure of the previously formed grooves or fissures 15 in the section 2, but does not entirely close them for the purposes hereinbefore set forth.

My invention comprehends golf club handle shafts which are not stepped as hereinbefore described but which have a gradual taper toward the head. To produce such a shaft embodying my invention, a cylindrical tube may first be tapered by apparatus illustrated in Figs. 13 and 14 and as more fully described in the above mentioned Batcheller application. After the tube has been tapered it may be grooved as at 45, Fig. 17, where a section of the tapered tube 46 is illustrated, and the grooves 45 may begin and terminate at suitable longitudinally spaced points along the length of the tube. The tube may then be again drawn through a die and machine such as that illustrated in Figs. 13 and 14, and operated upon therein to redraw the tube, reducing its diameter over its entire length or over a portion thereof as may be desired, and at the same time tapering it, the tube then appearing as in Fig. 18 where, with respect to Fig. 17, it is shown of smaller tapering diameter and the groove 45 thereof is shown as partly closed up. In Figs. 15 and 16 are illustrated the tube sections 46 in longitudinal and transverse cross-section wherein is shown the above described internally projecting ribs 47—47 and on the outer surface of the tube the partly open grooves or crevices 48.

In a similar manner a cylindrical tube may have grooves pressed therein and then the cylindrical tube reduced to a tapering tube of smaller diameter to provide a tapering golf handle shaft with partly closed grooves therein.

There are other modifications of the above described handle shafts and the processes for making them which are comprehended within my invention. For example, in either the cylindrical tube or in the tapering tube, the grooves pressed in the wall by the die of Figs. 6 and 7 may either be of uniform depth from end to end or may be of varying depth, the variation in depth being accomplished as will be understood by movement of the head 30 in the direction of the arrow 31, or vice versa, during concurrent longitudinal movement of the tube 21 in the direction of the arrow 22. After such grooves of varying depth have been made, the tube may then be taper-drawn in the apparatus of Figs. 13 and 14, or may be generally tapered by providing it with sections of successively smaller diameter by the die apparatus of Figs. 8 to 12A inclusive.

Again, the advantages obtained in handle shafts of this type resulting from the provision of internal ribs and corresponding external grooves or crevices which are not entirely closed up on the external surface of the shaft, may be obtained and enjoyed in shafts in which the grooves are carried out to the extreme end, such as the end 9, of the tube instead of being stopped at the point 11 spaced from the end.

Again, that part of my invention which involves stopping or beginning the groove at a point spaced from the end, such as the point 11 spaced from the end 9, may be practiced with some of the attendant advantages thereof even if the grooves are entirely closed tight by the tapering or stepping die operation on all or a part of the extent of the groove.

In other respects, my invention is not limited to the exact details of apparatus and of resultant shaft structure above shown and described and many other modifications and changes may be made therein within the scope and spirit of my invention without sacrificing its advantages.

Reference may be had to my co-pending application, Serial No. 605,373, filed April 15, 1932 which is directed to the golf club shaft produced by the method described and claimed herein, and which is a division of this application.

I claim:—

1. The method of making a golf club shaft, which includes forming a tube, then forming in the wall of the tube a plurality of circumferentially spaced, outwardly flaring recesses, then operating upon the outer surface of the tube on portions intermediate of the recesses to concurrently close up the sides of the recesses to dispose them mutually adjacent but out of mutual contact and to form inwardly projecting, longitudinally extending ribs coextensive with the recesses.

2. The method of making a golf club shaft, which includes first forming a tapered tube, then forming in the wall of the tapered tube a plurality of circumferentially spaced, longitudinally extending outwardly flaring recesses, then operating upon the outer surface of the tube on portions intermediate of the recesses to concurrently close up the sides of the recesses to dispose them mutually adjacent but out of mutual contact and to form inwardly projecting, longitudinally extending ribs coextensive with the recesses, and causing the finished tube to taper progressively toward one end.

3. The method of making a golf club shaft, which includes forming a tube, then forming in the wall of the tube a plurality of circumferentially spaced, longitudinally extending, outwardly flaring recesses, beginning at a point longitudinally spaced from one end of the tube, then operating upon the tube to taper it toward the end adjacent to which the recesses begin and to circumferentially close up the sides of the recesses to dispose them mutually adjacent but out of mutual contact, and to form inwardly projecting, longitudinally extending ribs coextensive with the recesses.

4. The method of making a golf club shaft, which includes forming a tube, then forming in the wall of the tube a plurality of circumferentially spaced, longitudinally extending, outwardly flaring recesses, beginning at a point longitudinally spaced from one end of the tube, then operating upon the tube to taper it toward the end adjacent to which the recesses begin, to form inwardly projecting, longitudinally extending ribs coextensive with the recesses.

5. The method of making a golf club shaft, which includes forming a tube, then forming in the wall of the tube a plurality of circumferentially spaced, longitudinally extending, outwardly flaring recesses, the recesses beginning at a point longitudinally spaced from one end of the tube, then operating upon the outer surface of the tube on portions intermediate of the recesses to concurrently close up the sides of the recesses and to form inwardly projecting, longitudinally extending ribs coextensive with the recesses.

6. The method of making a golf club shaft, which includes forming a tube, then forming in the wall of the tube a plurality of circumferentially spaced, longitudinally extending, outwardly flaring recesses, the recesses beginning at a point longitudinally spaced from one end of the tube, then operating upon the outer surface of the tube on portions intermediate of the recesses to concurrently close up the sides of the recesses to dispose them mutually adjacent but out of mutual contact and to form inwardly projecting, longitudinally extending ribs coextensive with the recesses.

7. The method of making a golf club shaft, which includes forming a tube, then forming in the wall of a tube a plurality of circumferentially spaced, longitudinally extending, outwardly flaring recesses, the recesses beginning at a point longitudinally spaced from one end of the tube, then operating upon the tube with a succession of drawing dies to taper the tube toward the end spaced from which the recesses begin by draw forming the tube into a longitudinal series of substantially cylindrical sections of successively smaller diameters and concurrently closing up the sides of the recesses to dispose them mutually adjacent but out of mutual contact and to form inwardly projecting, longitudinally extending ribs coextensive with the recesses.

8. The method of making a golf club shaft, which includes forming a tube, then forming in the wall of a tube a plurality of circumferentially spaced, longitudinally extending, outwardly flaring recesses, the recesses beginning at a point longitudinally spaced from one end of the tube, then operating upon the tube with a succession of drawing dies to taper the tube toward the end spaced from which the recesses begin by drawing the tube into a longitudinal series of substantially cylindrical sections of successively smaller diameters and concurrently closing up the sides of the recesses to dispose them mutually adjacent but out of mutual contact and to form inwardly projecting, longitudinally extending ribs coextensive with the recesses, and taper-drawing the section of smallest diameter at the small end of the tube.

9. The method of making a golf club shaft which includes first forming a tube, then operating upon the tube to provide in the wall thereof a plurality of longitudinally extending circumferentially spaced corrugations beginning at a point spaced from one end of the tube, and to cause the tube to taper toward the said end and to cause the outer surface of the uncorrugated end portion to merge into the surface portions between the corrugations.

10. The method of making a golf club shaft which includes forming a tapered tube, then operating upon the tube to provide in the wall thereof a plurality of longitudinally extending circumferentially spaced corrugations, beginning at a point spaced from one end of the tube, and draw-forming the tube to cause it to taper toward the said end and to reduce the diameter thereof on the tapered portion and to cause the outer surface of the uncorrugated end portion to merge into the surface portions between the corrugations.

11. The method of making a golf club shaft which includes forming a tube, then operating upon the tube to provide in the wall thereof a plurality of longitudinally extending circumferentially spaced outwardly open grooves, beginning at a point spaced from one end of the tube, and then operating upon outer portions of the tube intermediate of the grooves to partly close up the grooves and to cause the tube to taper toward the said end.

12. The method of making a golf club shaft which includes forming a tube, then forming in the wall of the tube a longitudinally extending outwardly flaring recess, then operating upon outer portions only of the tube to concurrently collapse the sides of the recess to dispose them mutually adjacent but out of mutual contact and to form an inwardly projecting longitudinally extending rib coextensive with the recess, and causing the finished tube to taper progressively toward one end.

13. The method of making a golf club shaft which includes forming a tube, then forming in the wall of the tube a longitudinally extending outwardly flaring recess, then operating upon outer portions only of the tube to concurrently collapse the sides of the recess to dispose them mutually adjacent but out of mutual contact and to form an inwardly projecting longitudinally extending rib coextensive with the recess, and causing the finished tube to taper progressively toward one end with progressively increasing wall thickness.

14. The method of forming a golf club shaft which includes forming a tube, then operating upon the tube to provide in the wall thereof a longitudinally extending outwardly open groove beginning at a point spaced from one end of the tube and operating on outer portions only of the tube to partly collapse the groove and to cause the tube to taper toward the said end.

GEORGE B. DURELL.